United States Patent
Salgado

(10) Patent No.: US 7,697,156 B2
(45) Date of Patent: Apr. 13, 2010

(54) SYSTEMS AND METHODS FOR HIGHLIGHTING PRINT JOBS IN A PRINT QUEUE

(75) Inventor: David Salgado, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 1385 days.

(21) Appl. No.: 11/116,637

(22) Filed: Apr. 28, 2005

(65) Prior Publication Data

US 2006/0244998 A1   Nov. 2, 2006

(51) Int. Cl.
G06F 3/12 (2006.01)

(52) U.S. Cl. .............. 358/1.15; 358/1.9; 358/1.16; 715/733; 715/738; 715/739; 714/37

(58) Field of Classification Search .............. 358/1.15, 358/1.16, 1.9; 715/733, 738, 739; 714/37; 709/229
See application file for complete search history.

(56) References Cited

U.S. PATENT DOCUMENTS

| | | | |
|---|---|---|---|
| 4,947,345 A | 8/1990 | Paradise et al. | |
| 5,119,471 A * | 6/1992 | Kagaya et al. | 358/1.11 |
| 5,129,639 A | 6/1992 | DeHority | |
| 5,181,162 A | 1/1993 | Smith et al. | |
| 5,206,735 A | 4/1993 | Gauronski et al. | |
| 5,287,194 A | 2/1994 | Lobiondo | |
| 5,450,571 A | 9/1995 | Rosekrans et al. | |
| 5,467,434 A | 11/1995 | Hower, Jr. et al. | |
| 5,493,634 A | 2/1996 | Bonk et al. | |
| 5,559,933 A * | 9/1996 | Boswell | 358/1.15 |
| 5,574,831 A | 11/1996 | Grenda | |
| 5,596,416 A | 1/1997 | Barry et al. | |
| 5,978,559 A | 11/1999 | Quinion | |
| 6,075,925 A * | 6/2000 | Downing et al. | 358/1.1 |
| 6,678,068 B1 * | 1/2004 | Richter et al. | 358/1.15 |
| 6,944,412 B2 * | 9/2005 | Mishima et al. | 399/81 |
| 7,130,078 B2 * | 10/2006 | Matsuda | 358/1.9 |
| 7,239,409 B2 * | 7/2007 | Parry | 358/1.15 |
| 7,284,061 B2 * | 10/2007 | Matsubayashi et al. | 709/229 |
| 2007/0226204 A1 * | 9/2007 | Feldman | 707/5 |

* cited by examiner

*Primary Examiner*—Twyler L Haskins
*Assistant Examiner*—Dennis Dicker
(74) *Attorney, Agent, or Firm*—Gibb I.P. Law Firm, LLC

(57) ABSTRACT

A method and system organizes multiple print jobs to be processed by a printing engine in a print queue and displays a listing of the multiple print jobs within the print queue. This listing identifies the order in which the multiple print jobs will be processed by the printing engine. After identifying an active user, the method highlights print jobs of the active user within the listing of the multiple print jobs and can simultaneously display a listing of most recently completed print jobs of the active user. The method and system can also simultaneously list jobs of the active user within other queues.

20 Claims, 3 Drawing Sheets

SYSTEMS AND METHODS FOR HIGHLIGHTING PRINT JOBS IN A PRINT QUEUE

BACKGROUND

Embodiments herein generally relate to print queue systems and methods and more particularly to a system and method that highlights print jobs of the active user within the listing of the multiple print jobs.

As described in U.S. Pat. No. 5,978,559 to Quinion (Issued: Nov. 2, 1999 and incorporated herein by reference) a print job is developed at a workstation and delivered to a printer, by way of a server, for the purpose of executing the job. An example of such standard network printing modeling is disclosed in U.S. Pat. No. 5,493,634 to Bonk et al. (Issued: Feb. 20, 1996 and incorporated herein by reference). This printing model is appropriate for those situations in which the printer is well suited for printing the job in accordance with certain criteria required by the system user. For example, if the user expects to have a selected number of prints generated within a certain time frame at a selected location, and such criteria is met at the printer, then the user is satisfied. To avoid customer dissatisfaction, a distributed printing model of the type disclosed in U.S. Pat. No. 5,287,194 to Lobiondo ("Lobiondo") (Issued: Feb. 15, 1994 and incorporated herein by reference) has been proposed. Lobiondo discloses a printshop management scheduling routine and system which provide optimum scheduling of print jobs on a network. The scheduling routine utilizes the total complex of printers available at a local location and/or remote locations to allocate and complete print jobs based on a plurality of criteria, including requested completion time for the project. If requested completion time does not allow printing of the print job by a sole printer, the print job is allocated to a plurality of available printers, each printing a portion of the complete print job.

Other distributed printing models are disclosed in U.S. Pat. No. 5,574,831 to Grenda (Issued: Nov. 12, 1996 and incorporated herein by reference) and U.S. Pat. No. 5,596,416 to Barry et al. (Issued: Jan. 21, 1997 and incorporated herein by reference). In particular, the '831 patent discloses a print array having an electronic image control device communicating with both first and second printer engines. Image data is routed from the second printer engine to the first printer engine when a failed status signal is provided by the second printer engine to the electronic image control device.

The above-mentioned patents directly or indirectly address the concept of classifying a job in accordance with one or more attributes of the job. Describing a job in terms of job level and/or page level attributes is considered, in some detail, by the disclosure of U.S. Pat. No. 5,181,162 to Smith et al. (Issued: Jan. 19, 1993 and incorporated herein by reference). The Smith patent discloses an object oriented document management and production system in which documents are represented as collections of logical components or "objects" that may be combined and physically mapped into a page-by-page layout. Stored objects are organized, accessed and manipulated through a database management system.

The concept of managing a job on the basis of its attributes is further disclosed in U.S. Pat. No. 5,467,434 to Hower Jr. et al. (Issued: Nov. 14, 1995 and incorporated herein by reference) and U.S. Pat. No. 5,450,571 to Rosekrans et al. (Issued: Sep. 12, 1995 and incorporated herein by reference). Each of the Hower and Rosekrans patents illustrate systems which use servers having multiple queue capability. Moreover, U.S. Pat. No. 5,129,639 to DeHority (Issued Jun. 14, 1992 and incorporated herein by reference) discloses a system which permits interactive communication between a client and a server when the server is unable, because of an attribute mismatch, to fulfill the requirements of the client's job.

The advantage of using one or more queues in a printing process has been demonstrated by U.S. Pat. No. 4,947,345 to Paradise et al. (Issued Aug. 7, 1990 and incorporated herein by reference). Paradise discloses a system in which copy/print jobs are delivered to an output queue which communicates with a printer while Fax jobs are delivered to a hold queue which communicates with the output queue. In practice, after a certain number of Fax jobs have accumulated in the hold queue, they are delivered to the output queue in such a manner that the Fax jobs are printed ahead of all jobs currently residing in the output queue. Another queue arrangement for a printing system is described in U.S. Pat. No. 5,206,735 to Gauronski et al. (incorporated herein by reference). As illustrated by U.S. Pat. Nos. 5,450,571 and 5,467,434, (incorporated herein by reference) multiple queues can be advantageously to distribute jobs across a network printing system.

SUMMARY

A method embodiment herein organizes multiple print jobs to be processed by a printing engine in a print queue and displays a listing of the multiple print jobs within the print queue. This listing identifies the order in which the multiple print jobs will be processed by the printing engine. After identifying an active user, the method highlights print jobs of the active user within the listing of the multiple print jobs and can simultaneously display a listing of most recently completed print jobs of the active user. The method can also list jobs of the active user within other print queues.

The highlighting of the print jobs of the active user changes the appearance of the print jobs of the active user, when compared to other print jobs within the listing of the multiple print jobs. More specifically, the embodiments herein change items such as the character color, character shading, character font, character size, and appearance of the characters used to identify the print jobs listed in the print queue so that the active user can easily distinguish his pending print jobs from all other pending print jobs.

The method changes which print jobs are highlighted depending on which user is currently the active user. The method can use the internal memory of the active user's computer, keyboard input, keypad input, touchpad input, pointing device input, touch screen input, voice recognition, optical recognition, radio frequency recognition, etc. to identify the active user.

An apparatus embodiment includes a printing engine and a processor operatively connected to the printing engine. The processor is adapted to organize multiple print jobs to be processed by the printing engine in the print queue. A graphic user interface is operatively connected to the processor. The graphic user interface is adapted to display a listing of the multiple print jobs within the print queue. The graphic user interface includes an input for identifying an active user. After identifying the active user, the graphic user interface highlights the print jobs of the active user within the listing of the multiple print jobs. Further, the graphic user interface can simultaneously display a listing of most recently completed print jobs of the active user and a listing of jobs of the active user within other print queues.

When the graphic user interface highlights the print jobs of the active user, the graphic user interface changes the appearance of the print jobs of the active user, when compared to other print jobs within the listing of the multiple print jobs.

The change in appearance can comprise, for example, character color, character shading, character font, character size, and character appearance, etc. The graphic user interface is adapted to change which print jobs are highlighted depending on which user is currently the active user. The input for identifying the active user comprises one of internal memory, keyboard input, keypad input, touchpad input, pointing device input, touch screen input, voice recognition, optical recognition, and radio frequency recognition.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Almost all multifunctional printing devices (MFD) contain job queue(s) for the jobs in the system. These queues can include a print queue, fax queue, and completed job queue and normally appear on the local user interface (UI) or printer driver UI in a Job Status screen. When the system has a lot of jobs (e.g., due to one large job backing up all the other jobs or a back up due to paper jam), it can become very difficult for a user to locate his/her jobs and determine their current status (e.g. position in queue for completion of printing, which ones have completed). The inability to locate where a job is in the queue leads to user frustration and dissatisfaction with the printing device.

The embodiments herein provide a new "Display My Jobs" capability for MFD's Job Status UI screens. The "Display My Jobs" capability will highlight a user's jobs in the system.

When "Display My Jobs" functionality has been engaged, the user enters their user name and the system provides enhanced personalized job display. Within the currently displayed job queue embodiments herein highlight (in color or bright white, for example) the user's jobs. The embodiments herein can also display the user's completed jobs (most recent at top) next to the current queue and display a message notifying the user if they have any active jobs in other queues. Thus, embodiments herein enable a user to quickly identify and locate their jobs within the system's jobs.

Figure 1:
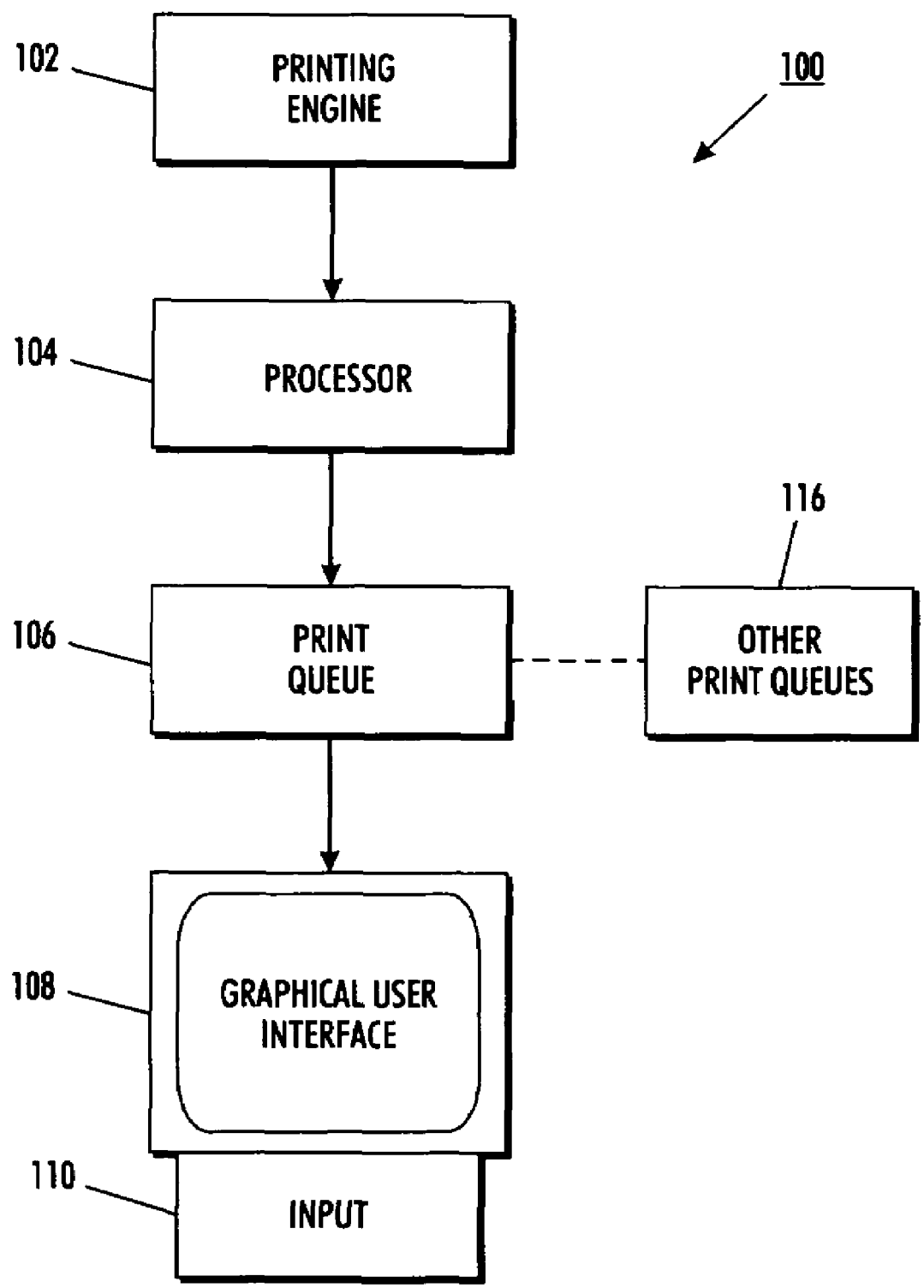
FIG. 1 is a schematic representation of an apparatus for displaying a print queue according to embodiments herein.

More specifically, as shown in FIG. 1, an apparatus embodiment 100 includes a printing engine 102 and a processor 104 operatively connected to the printing engine 102. The printing engine 102 can comprise any form of device that has the ability to print on any medium, including a Xerographic printer, a laser printer, a dot-matrix printer, etc. The processor 104 can comprise any type of logic device, such as a central processing unit computer chip, which can process instructions that are stored in permanent or non-permanent memory or logic devices. The processor 104 can be a separate item from the printing engine or can be included with the printing engine. The processor 104 is adapted to organize multiple print jobs to be processed by the printing engine 102 in the print queue 106.

A graphic user interface 108 is operatively connected to the processor 104. The graphic user interface 108 can comprise any form of display including cathode ray tube (CRT), liquid crystal display (LCD), plasma display, etc. The graphic user interface 108 is adapted to display a listing of the multiple print jobs 206 within the print queue 106, as shown, for example, in FIG. 2.

The graphic user interface 108 includes an input 110 for identifying an active user. The input 110 for identifying the active user can comprises any type of user input, whether now known or developed in the future. For example, if the user is logging on to a print server's print queue through a network connection, the input is simply the user's computer ID which can be stored in the user's computer's internal memory. Alternatively, the user can identify their self by providing keyboard input, keypad input, touchpad input, pointing device input, touch screen input, voice recognition, optical recognition, and radio frequency recognition, etc. Therefore, the actual input device 110 can comprise the internal memory of the active user's computer, a keyboard, keypad, touchpad, pointing device (mouse, trackball, touchpad, etc.) touch screen, voice recognition microphone, optical recognition device, radio frequency recognition receiver, etc. With the remote version of the user interface, the embodiment can display multiple device's queues (besides the specific device it is hooked up to). For example, if two jobs are sent for printing (one to a color device, and one to a black and white device), the remote version will allow the user to switch between the color's print queue and the black and white's print queue. When the user looks at the color device's print queue, a message will be displayed at the bottom stating i.e., "you have 1 job in the black and white print queue."

Figure 2:
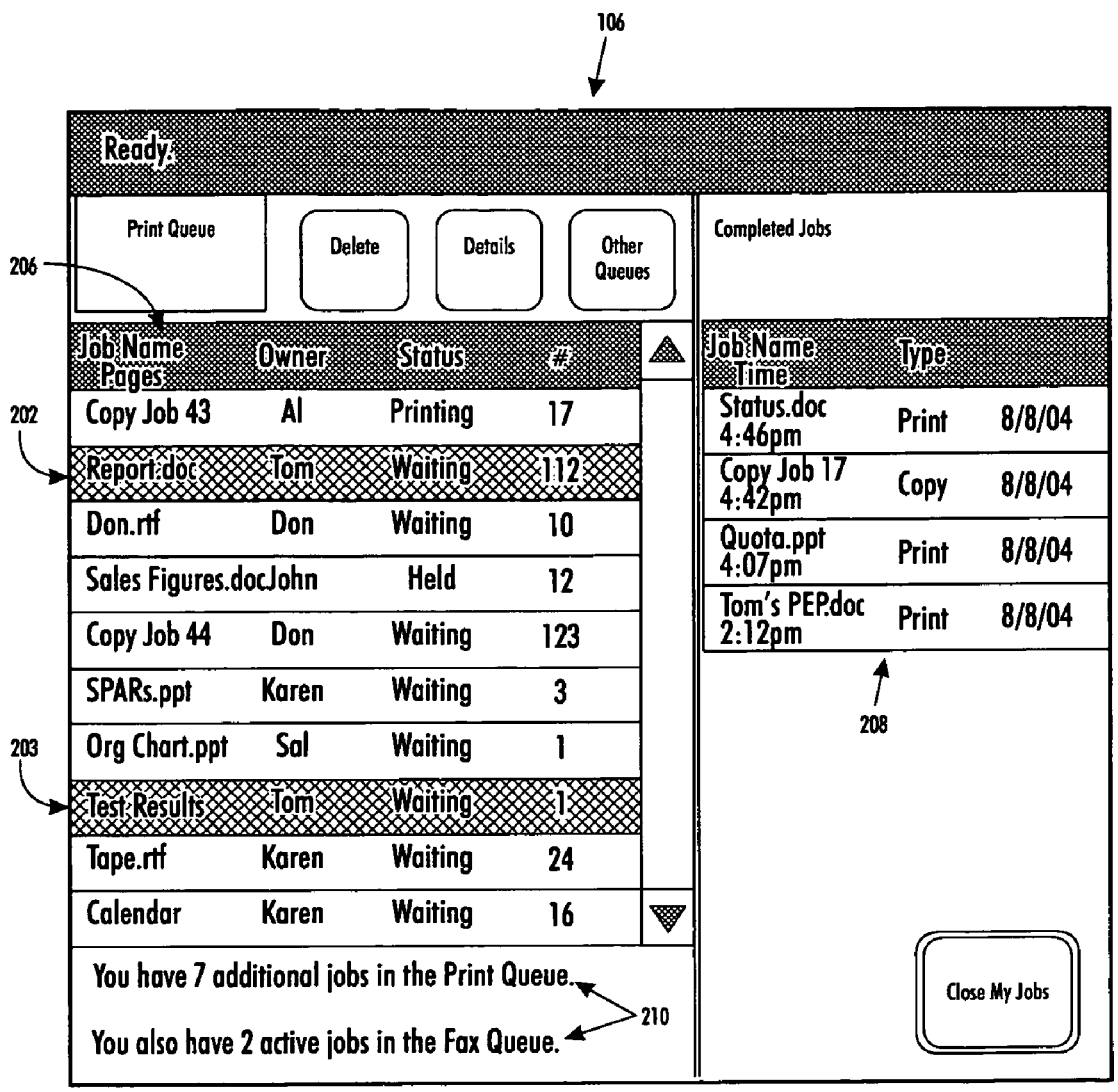
FIG. 2 is a schematic representation of a print queue according to embodiments herein.

After identifying the active user, the graphic user interface 108 (acting in cooperation with, or at the instruction of the processor 101) highlights the print jobs (202-203) of the active user within the listing of the multiple print jobs 206, as shown in FIG. 2. Further, the graphic user interface 108 (again acting in cooperation with, or at the instruction of the processor 101) can simultaneously display a listing of most recently completed print jobs of the active user 208 and a listing 210 of jobs of the active user within other print queues 116 along with the listing of multiple print jobs 206.

When the graphic user interface 108 highlights the print jobs of the active user, the graphic user interface 108 changes the appearance of the print jobs of the active user, when compared to other print jobs within the listing of the multiple print jobs. While FIG. 2 illustrates this change in appearance as highlight image text when compared to the remaining text, the change in appearance can take any form that would help the active user identify his print jobs. For example, the change in appearance of the text or characters used in the list of print jobs can include character color, character shading, character font, character size, and character appearance, etc.

The graphic user interface 108 is adapted to change which print jobs are highlighted depending on which user is currently the active user. For purposes of this application, a print job is at least one page or document that a user sent to the printing engine (from any source). The "active user" is the user who is currently checking the print queue and is the one identified by the input 110. In one embodiment herein only one user can be the active user at any one time at any one graphic user interface. In other embodiments, multiple users (all user's in a team or group) can be active users; however, this should be limited to avoid having too many print jobs highlighted.

Figure 3:
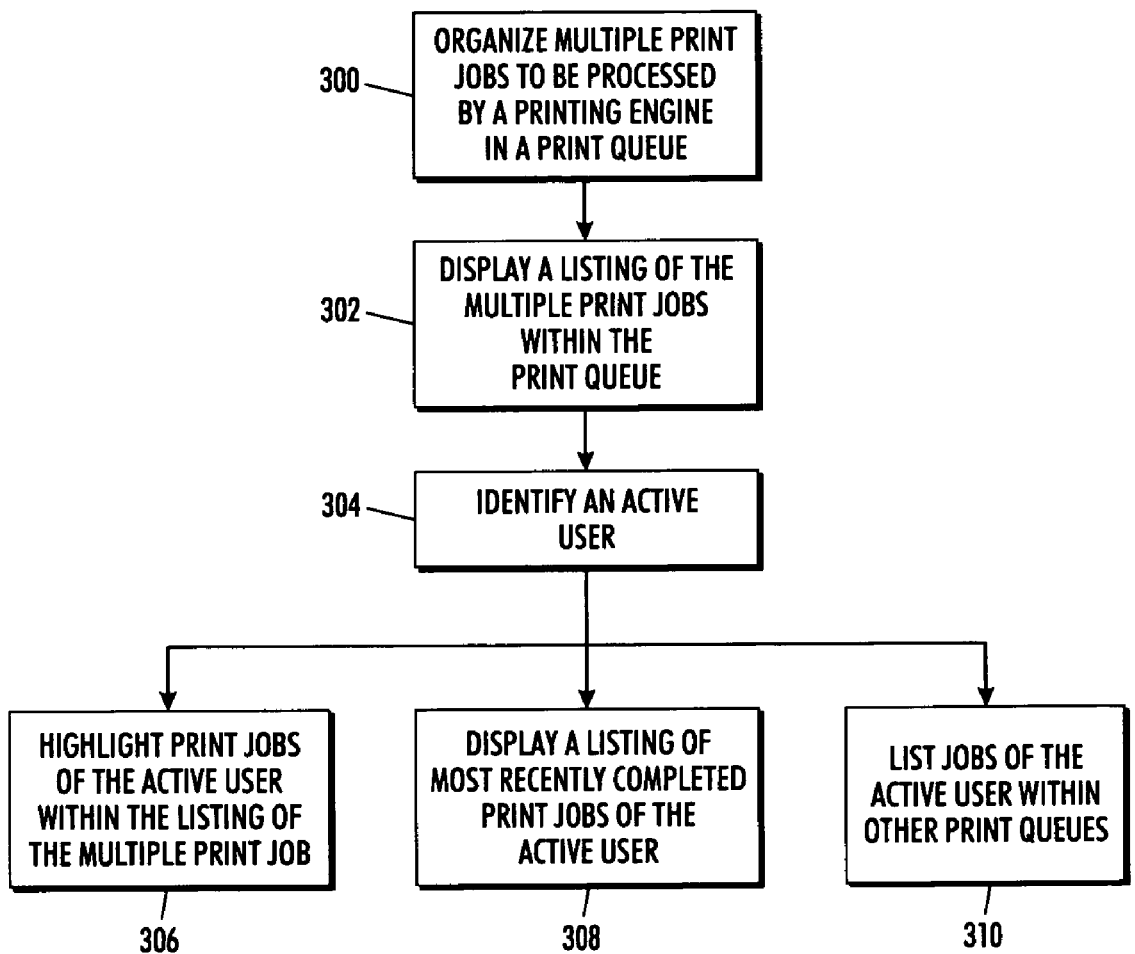
FIG. 3 is a flowchart illustrating a method embodiment.

As shown in FIG. 3, a method embodiment herein organizes multiple print jobs to be processed by a printing engine in a print queue (item 300). In item 302, the method displays a listing of the multiple print jobs within the print queue. This listing identifies the order in which the multiple print jobs will be processed by the printing engine. After identifying an active user in item 304, the method highlights print jobs of the active user within the listing of the multiple print jobs (item 306). As shown in the flowchart, the method and can simultaneously display a listing of most recently completed print jobs of the active user 308 and can also list jobs of the active user within other print queues 310.

The highlighting of the print jobs of the active user 306 changes the appearance of the print jobs of the active user, when compared to other print jobs within the listing of the multiple print jobs. More specifically, the embodiments herein change items such as the character color, character shading, character font, character size, and character appearance of the characters used to identify the print jobs listed in the print queue.

The method changes which print jobs are highlighted depending on which user is currently the active user. The method uses internal memory of the active user's computer, keyboard input, keypad input, touchpad input, pointing device input, touch screen input, voice recognition, optical recognition, radio frequency recognition, etc. to identify the active user in item 304.

Thus, as shown above, when "Display My Jobs" functionality has been engaged, the user enters their user name and the system provides enhanced personalized job display. Within the currently displayed job queue embodiments herein highlight (in color or bright white, for example) the user's jobs. The embodiments herein can also display the user's completed jobs (most recent at top) next to the current queue and display a message notifying the user if they have any active jobs in other queues. Thus, embodiments herein enable a user to quickly identify and locate their jobs within the system's jobs.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An apparatus comprising:
   a printing engine;
   a processor operatively connected to said printing engine, wherein said processor is adapted to organize multiple user print jobs to be processed by said printing engine in a queue; and
   a graphic user interface operatively connected to said processor, wherein said graphic user interface is adapted to display a listing of said multiple user print jobs within said queue,
   wherein said graphic user interface includes an input that receives user specific input data to identify an active user at said graphic user interface, and
   wherein said graphic user interface is adapted to highlight and thereby change the appearance of print jobs of said active user relative to other print jobs within said listing of said multiple user print jobs displayed on said graphic user interface based on said user specific input data identifying said active user.

2. The apparatus according to claim 1, wherein when said graphic user interface highlights said print jobs of said active user when compared to other print jobs within said listing of said multiple user print jobs.

3. The apparatus according to claim 2, wherein said appearance comprises one of character color, character shading, character font, character size, and character appearance.

4. The apparatus according to claim 1, wherein said graphic user interface is adapted to change which multiple user print jobs appearance are changed depending on which user is currently said active user.

5. The apparatus according to claim 1, wherein said graphic user interface is further adapted to list jobs of said active user within other queues.

6. The apparatus according to claim 1, wherein said input for identifying said active user comprises one of internal memory, keyboard input, keypad input, touchpad input, pointing device input, touch screen input, voice recognition, optical recognition, and radio frequency recognition.

7. The apparatus according to claim 1, wherein said listing of said multiple user print jobs identifies an order in which said multiple user print jobs will be processed by said printing engine.

8. An apparatus comprising:
   a printing engine;
   a processor operatively connected to said printing engine, wherein said processor is adapted to organize multiple user print jobs to be processed by said printing engine in a queue; and
   a graphic user interface operatively connected to said processor, wherein said graphic user interface is adapted to display a listing of said multiple user print jobs within said queue,
   wherein said graphic user interface includes an input for receiving user specific data that identifies an active user at said graphic user interface,
   wherein said graphic user interface is adapted to highlight and thereby change the appearance of print jobs of said active user relative to other print jobs within said listing of said multiple user print jobs displayed on said graphic user interface based on said received user specific data identifying of said active user, and
   wherein said graphic user interface is adapted to display a listing of most recently completed jobs of said active user.

9. The apparatus according to claim 8, wherein said graphic user interface is adapted to simultaneously display said listing of said multiple user print jobs and said most recently completed jobs.

10. The apparatus according to claim 8, wherein when said graphic user interface highlights said print jobs of said active user when compared to other print jobs within said listing of said multiple user print jobs.

11. The apparatus according to claim 10, wherein said appearance comprises one of character color, character shading, character font, character size, and character appearance.

12. The apparatus according to claim 8, wherein said graphic user interface is adapted to change which multiple user print jobs appearance are changed depending on which user is currently said active user.

13. The apparatus according to claim 8, wherein said graphic user interface is further adapted to list jobs of said active user within other queues.

14. The apparatus according to claim 8, wherein said input for identifying said active user comprises one of internal memory, keyboard input, keypad input, touchpad input, pointing device input, touch screen input, voice recognition, optical recognition, and radio frequency recognition.

15. A method comprising:
   organizing multiple user print jobs to be processed by a printing engine in a queue;

displaying a listing of said multiple user print jobs within said queue;

identifying an active user by receiving user specific data that identifies said active user; and simultaneously highlighting and thereby changing the appearance of print jobs of said active user relative to other print jobs within said displayed listing of said multiple user print jobs and displaying a listing of most recently completed jobs of said active user based on said identifying of said active user.

16. The method according to claim 15, wherein said changing the appearance of said print jobs of said active user comprises highlighting said print jobs of said active user when compared to other user print jobs within said listing of said multiple user print jobs.

17. The method according to claim 16, wherein said appearance comprises one of character color, character shading, character font, character size, and character appearance.

18. The method according to claim 15, further comprising changing which print jobs have a changed appearance depending on which user is currently said active user.

19. The method according to claim 15, further comprising listing jobs of said active user within other queues.

20. The method according to claim 15, wherein said identifying of said active user comprises using one of internal memory, keyboard input, keypad input, touchpad input, pointing device input, touch screen input, voice recognition, optical recognition, and radio frequency recognition.

* * * * *